(12) United States Patent
Ulman (10) Patent No.: US 11,373,450 B2
(45) Date of Patent: Jun. 28, 2022

(54) EYE-MOUNTED AUTHENTICATION SYSTEM

(71) Applicant: Tectus Corporation, Saratoga, CA (US)

(72) Inventor: Morrison Ulman, Los Altos, CA (US)

(73) Assignee: Tectus Corporation, Saratoga, CA (US)

( * ) Notice: Subject to any disclaimer, the term of this patent is extended or adjusted under 35 U.S.C. 154(b) by 411 days.

(21) Appl. No.: 16/046,836

(22) Filed: Jul. 26, 2018

(65) Prior Publication Data

US 2019/0050643 A1 Feb. 14, 2019

Related U.S. Application Data (60) Provisional application No. 62/544,572, filed on Aug. 11, 2017.

(51) Int. Cl.
| | | |
|---|---|---|
| *G06K 9/00* | (2022.01) | |
| *G06V 40/19* | (2022.01) | |
| *G02C 7/04* | (2006.01) | |
| *G06V 10/147* | (2022.01) | |

(52) U.S. Cl.
CPC .............. *G06V 40/19* (2022.01); *G02C 7/04* (2013.01); *G06V 10/147* (2022.01)

(58) Field of Classification Search
CPC ....... G06K 9/00604; G06K 9/209; G02C 7/04
See application file for complete search history.

(56) References Cited

U.S. PATENT DOCUMENTS

| | | | |
|---|---|---|---|
| 6,711,293 B1 | 3/2004 | Lowe | |
| 7,224,822 B2 | 5/2007 | Heacock | |
| 7,554,598 B2 | 6/2009 | Togino | |
| 8,127,882 B2 | 3/2012 | Johnson | |
| 8,285,003 B2 | 10/2012 | Fujii | |
| 8,798,332 B2 | 8/2014 | Otis | |
| 9,152,850 B2 | 10/2015 | Mogi | |
| 2004/0041027 A1* | 3/2004 | Reiffel | G06K 7/10603 |
| | | | 235/454 |
| 2006/0115130 A1* | 6/2006 | Kozlay | G06F 21/35 |
| | | | 382/117 |
| 2006/0147095 A1 | 7/2006 | Usher | |
| 2009/0093798 A1* | 4/2009 | Charles | A61F 9/0079 |
| | | | 606/4 |
| 2012/0236259 A1* | 9/2012 | Abramoff | A61B 3/12 |
| | | | 351/246 |
| 2014/0079296 A1 | 3/2014 | Cleland | |
| 2014/0193045 A1* | 7/2014 | Otis | G06K 9/00597 |
| | | | 382/117 |
| 2014/0282877 A1* | 9/2014 | Mahaffey | H04W 12/08 |
| | | | 726/3 |

(Continued)

FOREIGN PATENT DOCUMENTS

WO 2002007068 A1 1/2002

*Primary Examiner* — Solomon G Bezuayehu
(74) *Attorney, Agent, or Firm* — Fenwick & West LLP (57) ABSTRACT

Authentication of a user is based on an electronic contact lens that contains a retinal scanner. The retinal scanner captures a retinal scan, which is used to authenticate the user (i.e., what a person is). The contact lens itself may also be used in the authentication process (i.e., what a person has). Authentication based on these two factors are used to control access to assets.

13 Claims, 10 Drawing Sheets

(56) References Cited

U.S. PATENT DOCUMENTS

| | | | | |
|---|---|---|---|---|
| 2014/0341441 | A1* | 11/2014 | Slaby | G06F 21/32 |
| | | | | 382/117 |
| 2015/0148650 | A1* | 5/2015 | Pugh | G02C 11/10 |
| | | | | 600/407 |
| 2015/0313467 | A1* | 11/2015 | Sakai | A61B 3/1208 |
| | | | | 351/208 |
| 2016/0070121 | A1* | 3/2016 | Sales | G08B 21/02 |
| | | | | 351/158 |
| 2016/0183782 | A1* | 6/2016 | Yu | A61B 90/20 |
| | | | | 606/4 |
| 2016/0183796 | A1* | 6/2016 | Fukuma | A61B 3/107 |
| | | | | 705/2 |
| 2016/0188975 | A1 | 6/2016 | Cleland | |
| 2016/0353985 | A1* | 12/2016 | Haddadi | A61B 5/0022 |
| 2017/0011263 | A1 | 1/2017 | Andersen | |
| 2017/0020441 | A1* | 1/2017 | Flitsch | A61B 5/1112 |
| 2017/0024555 | A1* | 1/2017 | Flitsch | G06F 21/32 |
| 2017/0026790 | A1* | 1/2017 | Flitsch | A61B 5/1112 |
| 2017/0091550 | A1 | 3/2017 | Feng | |
| 2017/0270636 | A1* | 9/2017 | Shtukater | G02C 11/10 |
| 2018/0032813 | A1* | 2/2018 | Lee | G06K 9/00604 |
| 2018/0070819 | A1* | 3/2018 | Kanamori | A61B 3/0008 |
| 2018/0084995 | A1* | 3/2018 | Wang | A61B 3/0025 |
| 2018/0146050 | A1* | 5/2018 | Tanaka | H04N 21/25866 |
| 2018/0160898 | A1* | 6/2018 | Yoo | A61B 5/0075 |
| 2018/0232507 | A1* | 8/2018 | Zizi | G06K 9/00335 |
| 2018/0324177 | A1* | 11/2018 | Wang | H04W 12/1206 |

\* cited by examiner

EYE-MOUNTED AUTHENTICATION SYSTEM

CROSS-REFERENCE TO RELATED APPLICATION(S)

This application claims priority under 35 U.S.C. § 119(e) to U.S. Provisional Patent Application Ser. No. 62/544,572, "Authentication System," filed Aug. 11, 2017. The subject matter of all of the foregoing is incorporated herein by reference in their entirety.

BACKGROUND

1. Technical Field

This disclosure relates generally to authentication using an eye-mounted device.

2. Description of Related Art

Authentication is necessary for controlling access to computers, tablets, smart phones, vehicles, money (e.g. automated tellers, wired funds), health records, military hardware and many other assets.

Entering passwords, especially into web pages, is a ubiquitous authentication task of modern life. "Collectively, humans spend the equivalent of more than 1,300 years each day typing passwords, according to Cormac Herley, a principal researcher at Microsoft Corp." (from: "The Man Who Wrote Those Password Rules Has a New Tip: N3v$r M1^d!", by Robert McMillan, The Wall Street Journal, Aug. 8, 2017.) Password chores can be made easier by a password manager that reduces password recycling and promotes the use of long, randomly generated passwords.

Authentication may depend upon what a person knows, what a person has, what a person is, or some combination of the three. For example, a master password to a password manager is something that a person knows. Two-factor authentication may be based on something a person has, such as a smart phone running a time-based, one-time password algorithm.

An authentication scheme based on an iris scanner is an example of authentication by what a person is since the pattern of one's irises is unique, like a fingerprint. Lying somewhere between has and is, is a radio-frequency identification (RFID) chip installed subcutaneously in a person's hand. Waving the chip-containing hand in front of an RFID reader is then sufficient to open doors or complete a credit card transaction.

Another authentication scheme in the "what a person is" category is based on imaging the unique pattern of blood vessels and other features of the fundus of the eye. The fundus includes structures such as the retina, optic disc, macula, fovea and posterior pole.

Patterns of the retina are a desirable trait upon which to base authentication because they are unique to each eyeball and do not change over time. Furthermore, the retina is difficult to observe and therefore relatively secure from unauthorized copying. This is in contrast to the iris which is observable at useful resolution from several meters away.

The retina being hard to observe makes it attractive for authentication applications, but at the same time makes its use inconvenient. Goggles and head-mounted display helmets have been proposed as platforms for retina scanners. However, they are bulky, heavy and far from discreet.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Authentication of a user is based on an electronic contact lens that contains a retinal scanner. The retinal scanner captures a retinal scan, which is used to authenticate the user (i.e., what a person is). The contact lens itself may also be used in the authentication process (i.e., what a person has). Authentication based on these two factors are used to control access to assets.

The authentication processes and resulting access authorization may occur on the contact lens, off the contact lens, or remotely away from the user. In some applications, the authentication based on the retinal scan captured by the electronic contact lens may occur on-contact-lens, for example by comparing the retinal scan with retinal scans stored in memory on the contact lens. In other applications, the authentication based on the retinal scan may occur off-contact-lens, for example by transmitting the retinal scan to a necklace worn by the user. The necklace then performs the authentication. Authentication may also be performed remotely, for example by cloud-based services rather than by a necklace on the user's body. The authentication may be based on data derived from the retinal scan, rather than the actual retinal scan itself. The data used for authentication is referred to as authentication data.

In another aspect, certain authentication data may be used for the retinal scan and separate authentication data for the electronic contact lens, with separate processes for each. Alternatively, the two factors may be combined. For example, a hash of the retinal scan may be combined with an ID for the electronic contact lens, and a single process used to authenticate the user based on both the electronic contact lens and the retinal scan.

The authentication system described herein permits automatic, secure authentication for a variety of applications. For example, a person using the system may log into web sites simply by looking at a computer screen. The system depends on both what a person has and what a person is. The person has a special contact lens and is uniquely identified by their fundus pattern. The system may generate a unique authorization string for each asset to which access is sought. Said another way, the authentication system may generate a different password for every computer, vehicle, bank account, health record, battle tank, guided missile or other asset the person is authorized to access.

In some versions, the system works only when a specific contact lens is worn on a specific eyeball. In some embodiments, the system is configured so that retinal scans are never stored in memory and never transmitted from the contact lens. Thus when the electronic contact lens is removed from the one, correct eyeball, it becomes inoperative for authentication.

Figure 1:
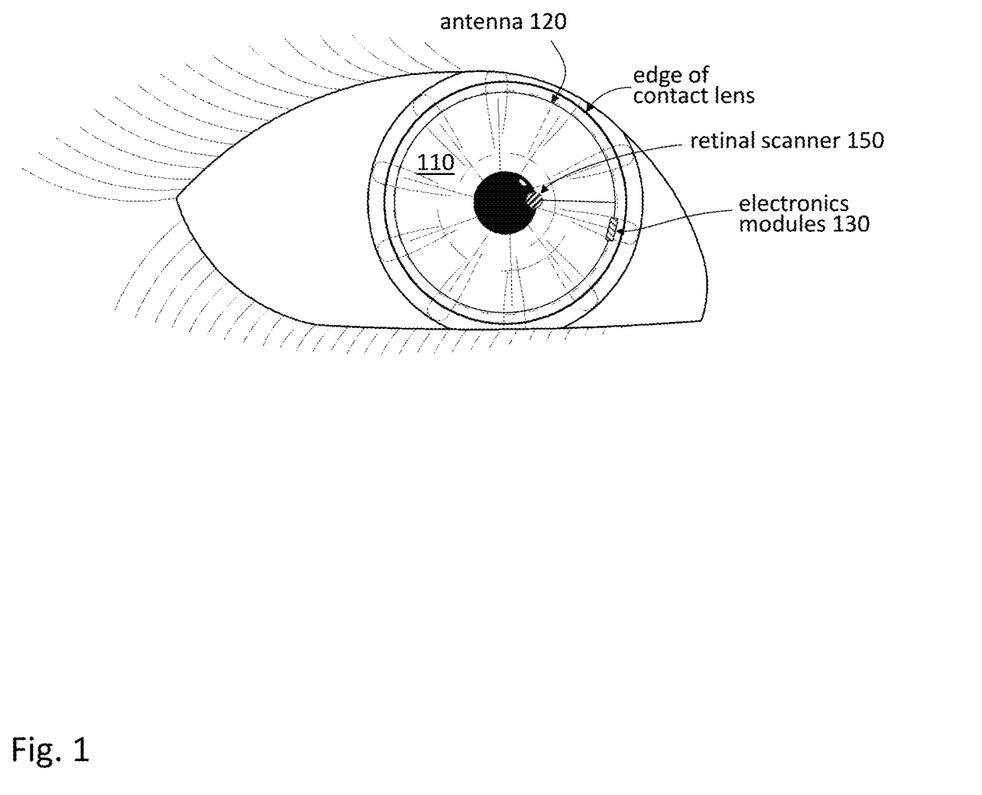
FIG. 1 shows a person's eye wearing an electronic contact lens.
Figure 2:
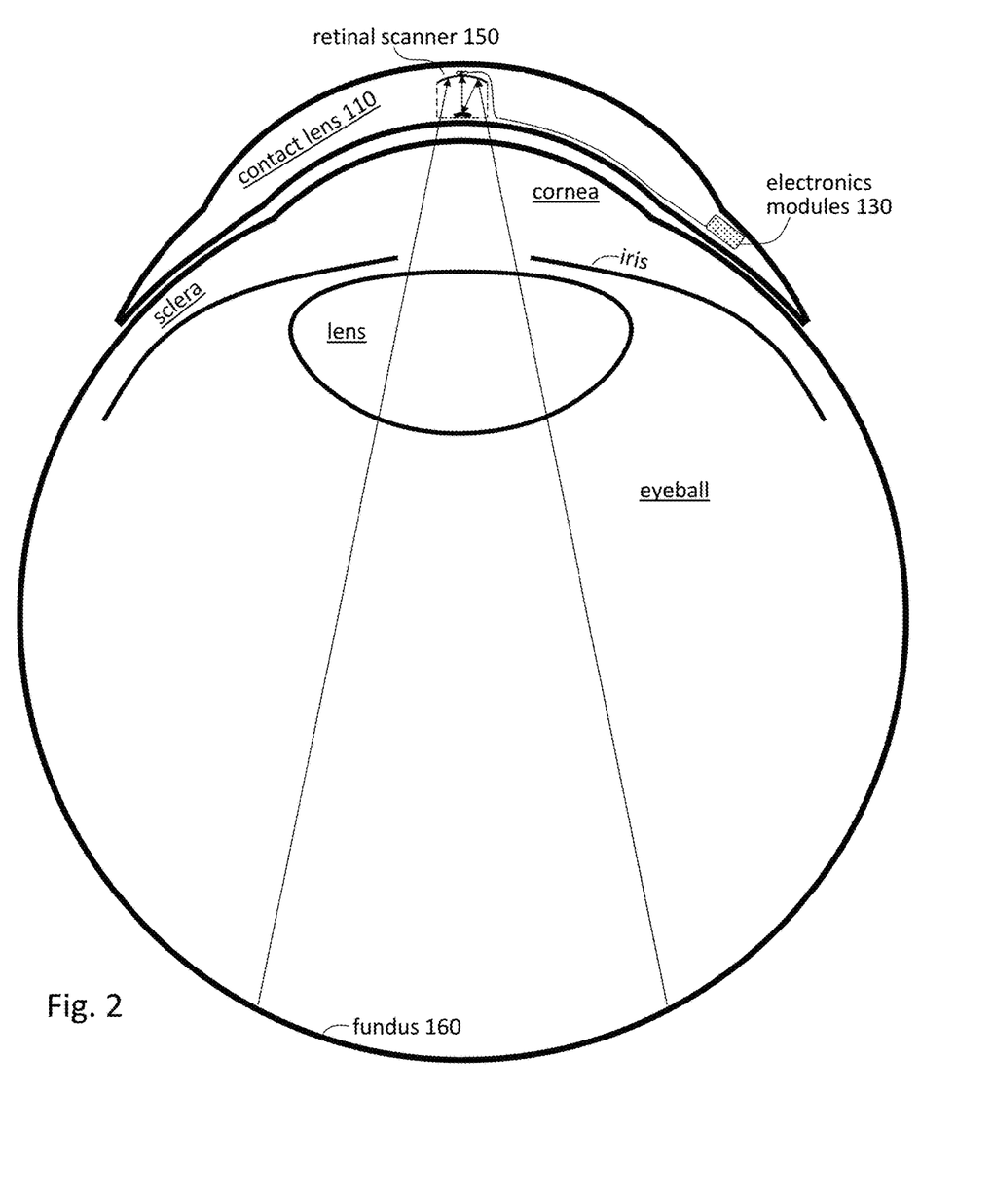
FIG. 2 is a cross-sectional view of an electronic contact lens mounted on an eye.

FIG. 1 shows a person's eye wearing an electronic contact lens 110. FIG. 2 is a schematic, cross-sectional view of the electronic contact lens 110 mounted on the eyeball. The lens 110 includes a coil or antenna 120, electronics modules 130 and a retinal scanner 150. The antenna 120 may receive both power and data via radio-frequency electromagnetic waves. It may also transmit data. The electronic modules 130 may include power management integrated circuits (IC), communications ICs, microprocessor ICs and/or application specific ICs (ASICs). The retinal scanner 150 captures images of the user's fundus 160, which are used to authenticate the user. User authentication may also be based on the electronic contact lens itself, such as the serial number for the electronic contact lens. The terms "fundus image," "retinal image," and "retinal scan" are used interchangeably herein. Retinal scanners are described in U.S. application Ser. No. 15/898,157, "Contact Lens with Retinal Camera," which is incorporated herein by reference. In an embodiment, as illustrated in FIG. 2, the electronic contact lens is a scleral lens. It rests on the sclera and is separated from the cornea by a tear layer roughly 100 to 200 um thick.

Figure 3:
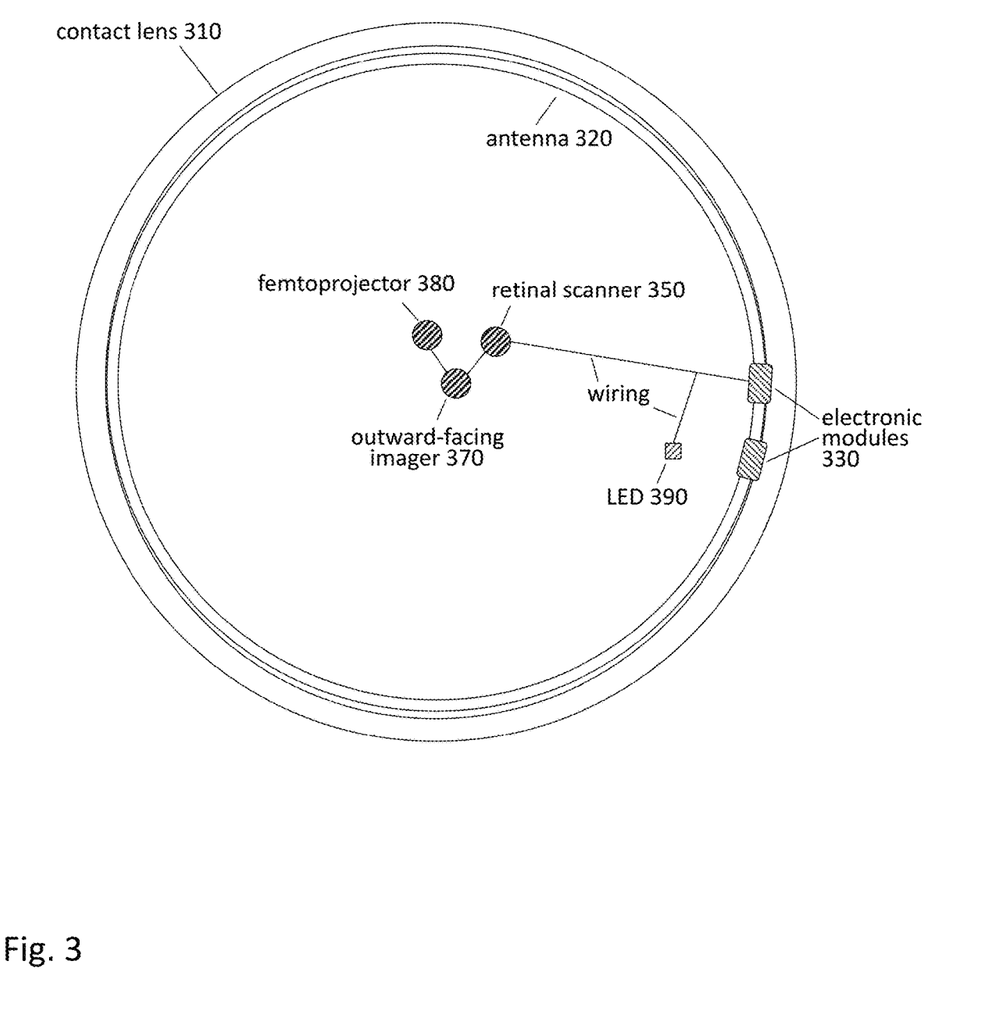
FIG. 3 is a view of an electronic contact lens illustrating various lens components.

FIG. 3 is a view of an electronic contact lens 310 illustrating various lens components, including additional components not shown in FIG. 1 or 2. For example, the lens of FIG. 3 includes an outward-facing imager 370 as well as a retinal scanner 350. In an embodiment, a contact lens may include such an outward facing imager 370 for capturing images of whatever a person is looking at and/or for receiving optical communications from an optical transmitter. Advanced optics for outward facing imagers have been described by Lemoff and Wiemer (e.g., see U.S. application Ser. No. 16/001,778, "Folded Optical Designs for Eye-mounted Cameras" and Ser. No. 16/034,761, "Advanced Optical Designs For Eye-Mounted Imaging Systems", which are incorporated herein by reference).

A femtoprojector 380 is also illustrated in FIG. 3. Femtoprojectors were proposed by Deering (e.g., see U.S. Pat. No. 8,786,675, "System using Eye Mounted Displays"). Advanced femtoprojector optics have been described by Miller and Lemoff et al. (e.g., see U.S. application Ser. No. 15/570,707, "Femtoprojector Optical Systems" and Ser. No. 15/985,511, "Advanced Femtoprojector Optical Systems"). All of the foregoing are incorporated herein by reference. A femtoprojector is a small video projector—so small that it fits inside a contact lens. The femtoprojector projects images through a person's eyeball onto the person's retina. A femtoprojector may therefore be part of a contact-lens-based display system. Such displays are simultaneously small, lightweight and capable of displaying high resolution images. In an embodiment, a contact lens may include a femtoprojector for displaying information to a lens wearer.

A light emitting diode (LED) 390 is also illustrated in FIG. 3. In various embodiments a contact lens may include an inward-facing LED, an outward-facing LED, or both. An inward-facing LED may be included in a lens to provide illumination for fundus images. An inward-facing LED may emit light at visible or infrared wavelengths. Similarly a retinal scanner 350 may be sensitive to visible or infrared wavelengths, or both. An inward-facing LED may be integrated with a retinal scanner. An outward-facing LED may be included in a lens for transmitting optical communications to an optical receiver.

Figure 4:
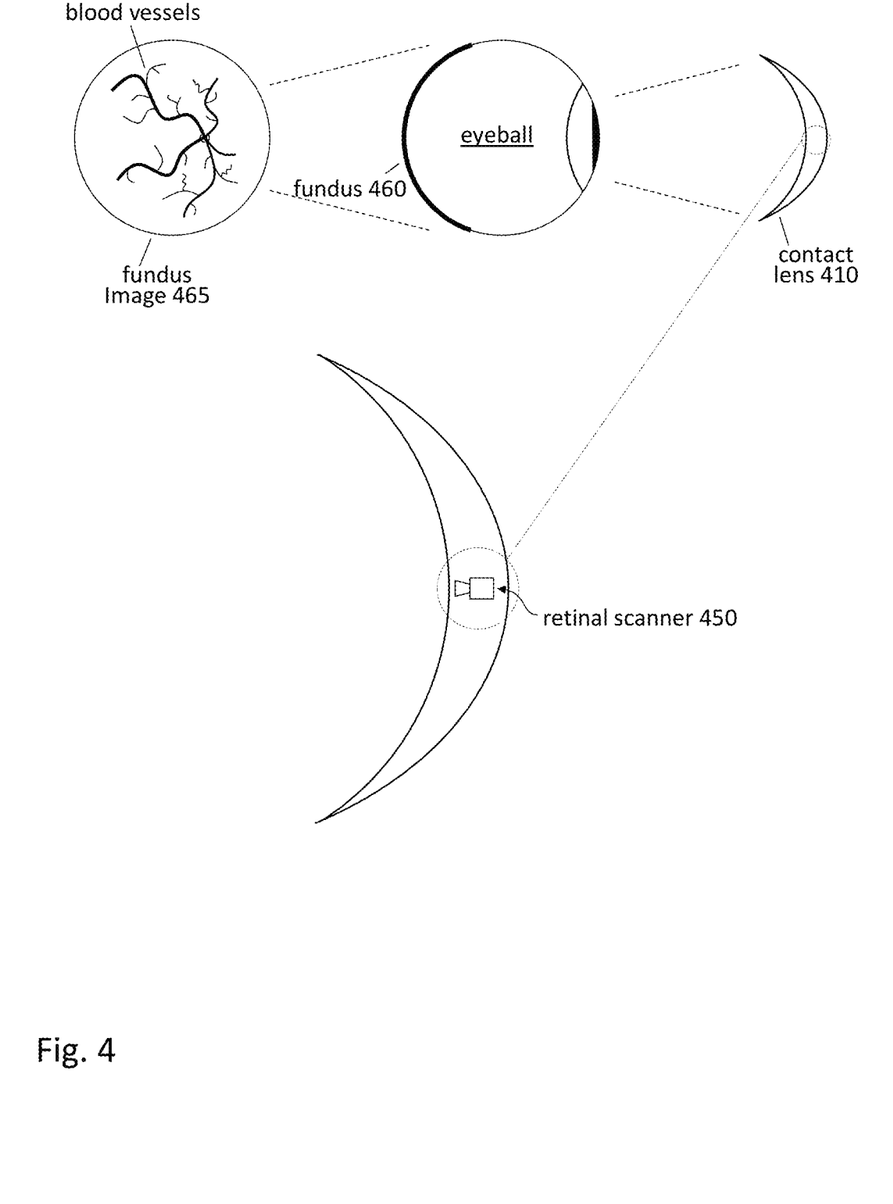
FIG. 4 is a schematic illustration of fundus image capture using an electronic contact lens.

FIG. 4 is a schematic illustration of fundus image capture using an electronic contact lens. The figure shows an exploded view including: an eyeball, a simulated fundus image 465 of the eyeball, a contact lens 410 that fits the eyeball, and a close-up view of the contact lens illustrating a retinal scanner 450. The fundus image 465 is captured by the retinal scanner. In some embodiments, an inward facing LED may be included in the contact lens to provide illumination for fundus images. For example, an inward-facing, infrared LED mounted in a contact lens may shine low-intensity infrared light into a person's eyeball. Reflection of infrared light from the fundus 460 reveals a pattern of blood vessels unique to each eyeball because the blood vessels absorb the light more readily than the surrounding tissue. If no LED illumination is provided, a retinal scanner may still obtain a fundus image illuminated by ambient light.

Figure 5A:
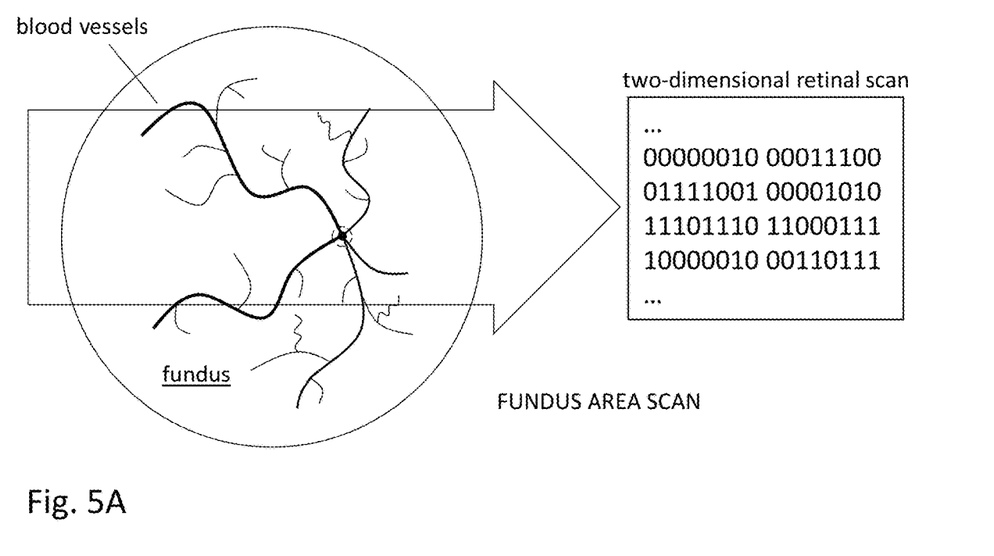
FIG. 5A is a schematic illustration of two-dimensional fundus image capture.
Figure 5B:
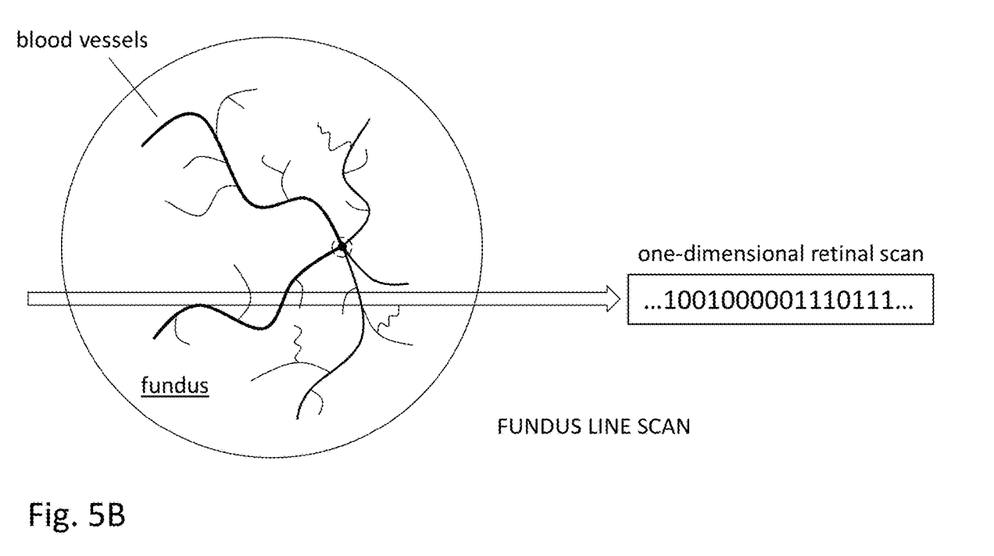
FIG. 5B is a schematic illustration of one-dimensional fundus image capture.

FIGS. 5A and 5B are schematic illustrations of two-dimensional and one-dimensional image capture, respectively. In FIG. 5A, a two-dimensional fundus image obtained by a retinal scanner in a contact lens is captured as digital data representing light intensity in one or more color channels (e.g. red, green, blue, infrared, etc.). Two-dimensional fundus images may be captured by a retinal scanner that includes a two-dimensional sensor array, or that includes a one-dimensional sensor array that is scanned along the second dimension, or that includes a single sensor that is scanned along two dimensions.

In FIG. 5B, a one-dimensional image, or line scan, obtained by a retinal scanner in a contact lens is captured as digital data representing light intensity in one or more color channels. The retinal scanner may include a one-dimensional sensor array that captures a corresponding line image of the fundus. A retinal scanner that obtains only one-dimensional or line-scan images may have a simpler design than a retinal scanner that is capable of obtaining two-dimensional images. A line-scan retinal scanner may have only a linear photodetector array, for example, instead of a two-dimensional array.

Alternatively, a two-dimensional area of the fundus may be imaged onto the one-dimensional sensor array, for example by use of a cylindrical lens. In another approach, a single sensor may be scanned across the fundus to capture the one-dimensional image. Two-dimensional sensor arrays may also be used, for example different rows in the array may use different spectral filters so that the retinal scanner captures a multi-spectral retinal scan.

FIGS. 6-10 illustrate different systems and applications that authorize access to assets based on successful authentication of the user from the retinal scan and electronic contact lens.

Figure 6:
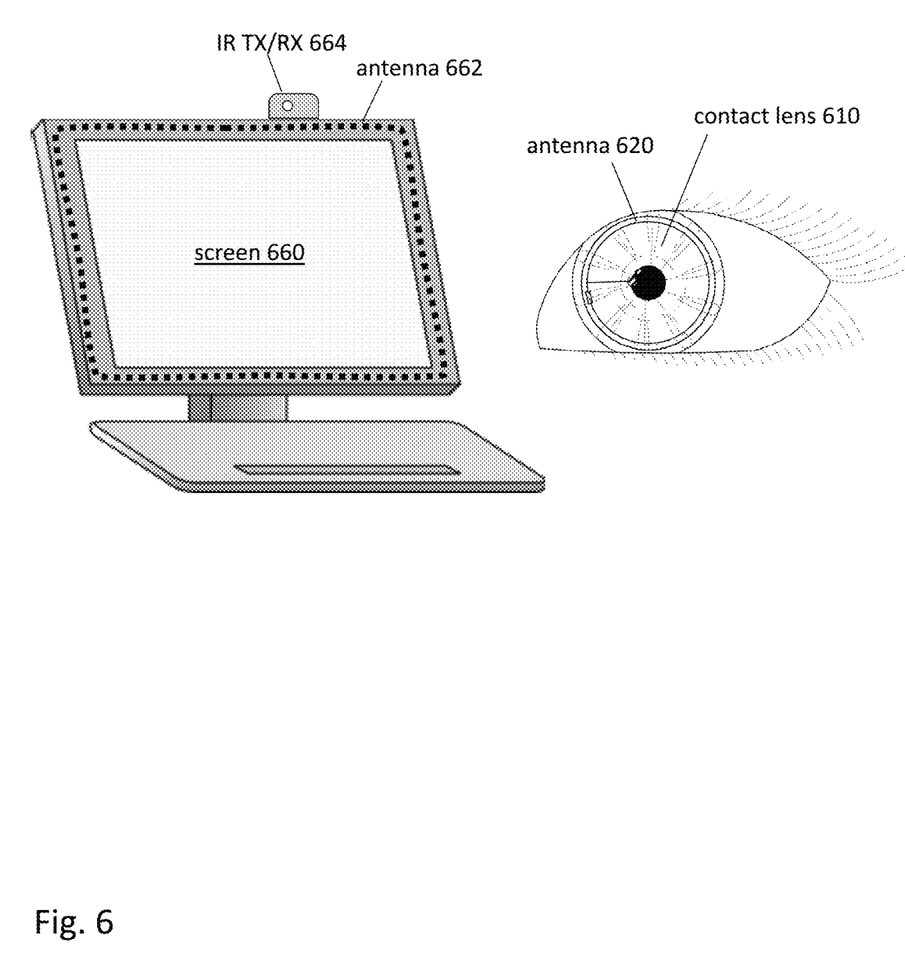
FIG. 6 shows an authentication system interacting with a display screen.

FIG. 6 illustrates an authentication system interacting with a display screen 660 to grant access to a computer system. In FIG. 6, a person (only eyeball shown) wears an electronic contact lens 610 such as a lens of FIGS. 1-4. The lens 610 includes a radio-frequency antenna 620 and may also include an outward-facing LED and/or an outward-facing imaging system. The antenna 620 may be configured to receive electromagnetic energy to provide electrical power to the lens. In addition, the antenna may receive data signals. In some embodiments, data signals may be encoded as modulation of a radio frequency carrier signal that provides power to the lens 610.

The display screen 660 also includes a radio frequency antenna 662. For example, a display screen may include a loop, dipole, Yagi or other type of radio antenna. Such an antenna 662 may be hidden in the enclosure or frame of the display or it may be a separate component connected to a display or ancillary equipment associated with a display. The display screen may also include an optical transmitter, receiver or transceiver. Optical communications equipment may be hidden in the enclosure of a display or provided in a separate package. An infrared communications system 664, for example, may be hidden behind a low-pass or band-pass infrared filter that appears dark to the unaided eye. An optical transceiver may include an LED and a photodiode.

Figure 7:
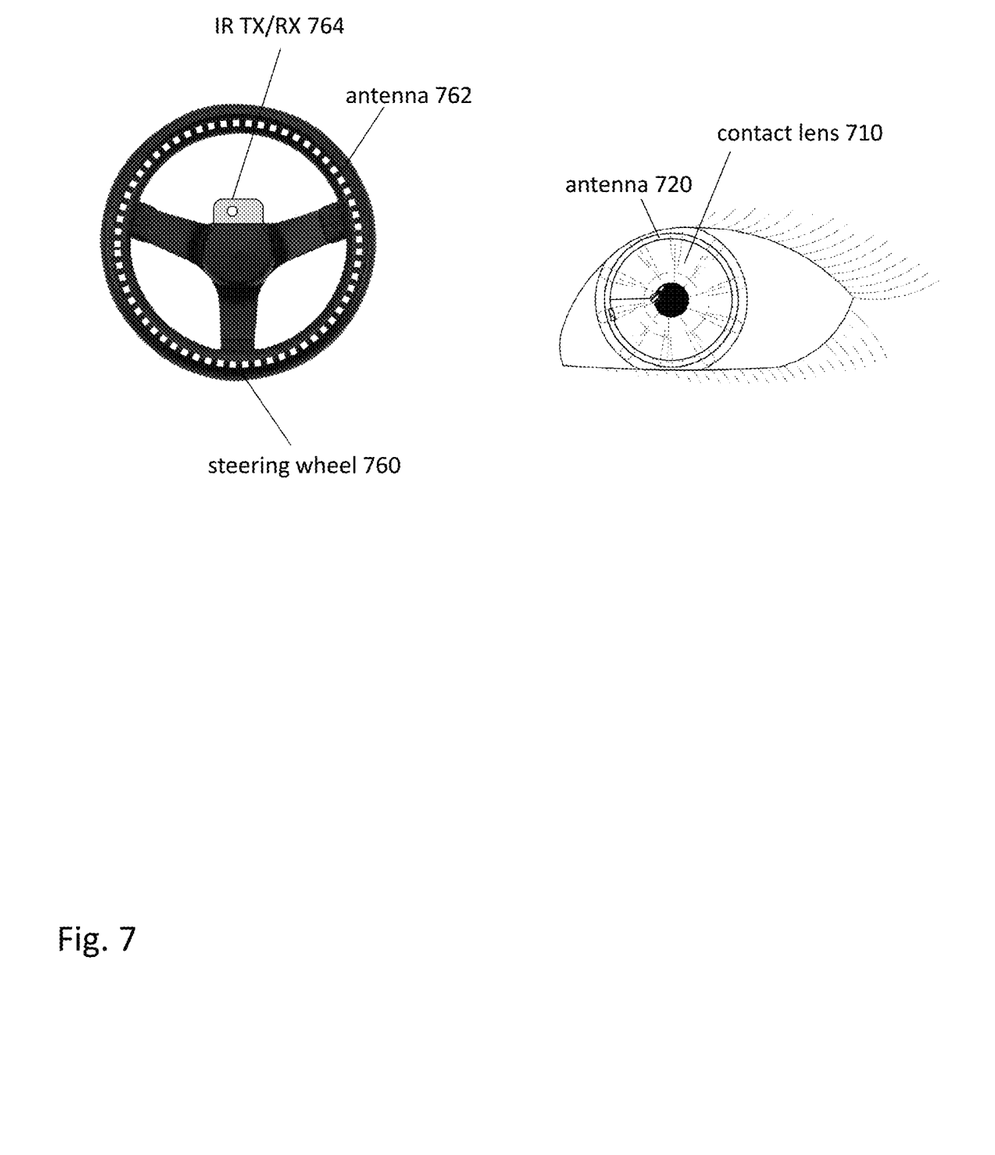
FIG. 7 shows an authentication system interacting with a steering wheel.

FIG. 7 illustrates an authentication system interacting with a steering wheel 760 to grant access to a vehicle. The scenario illustrated in FIG. 6 is similar to that of FIG. 7, except that the asset to which a person seeks access is a vehicle having a steering wheel rather than a computer system having a screen. The steering wheel 760 contains an antenna 762 and/or an optical transceiver 764. Of course, a vehicle may have an antenna and/or optical transceiver mounted somewhere other than its steering wheel. Communications components may be mounted in a dashboard, door or other part of a vehicle, as examples.

Figure 8:
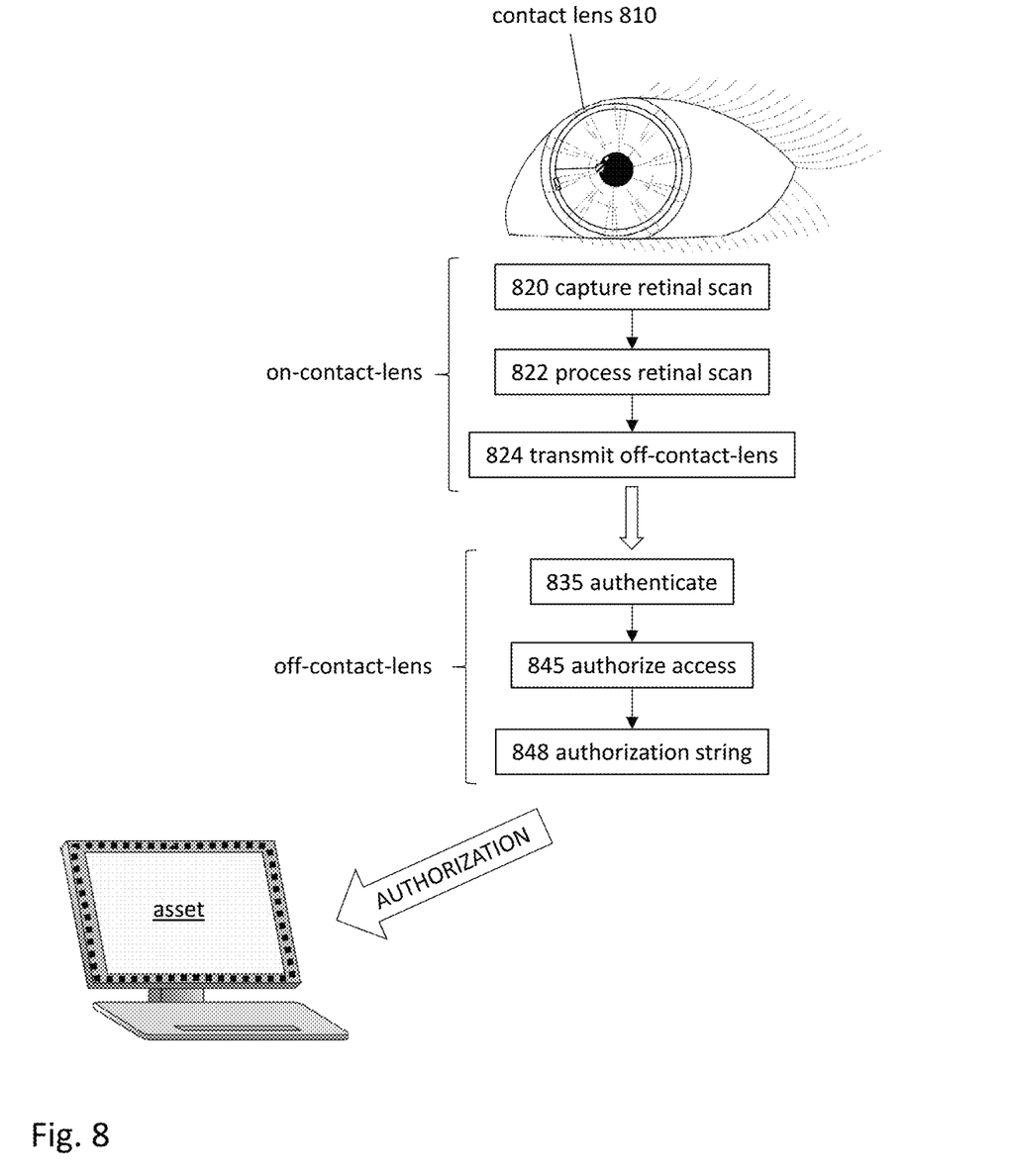
FIGS. 8, 9 and 10 are additional examples of authentication processes.
Figure 9:
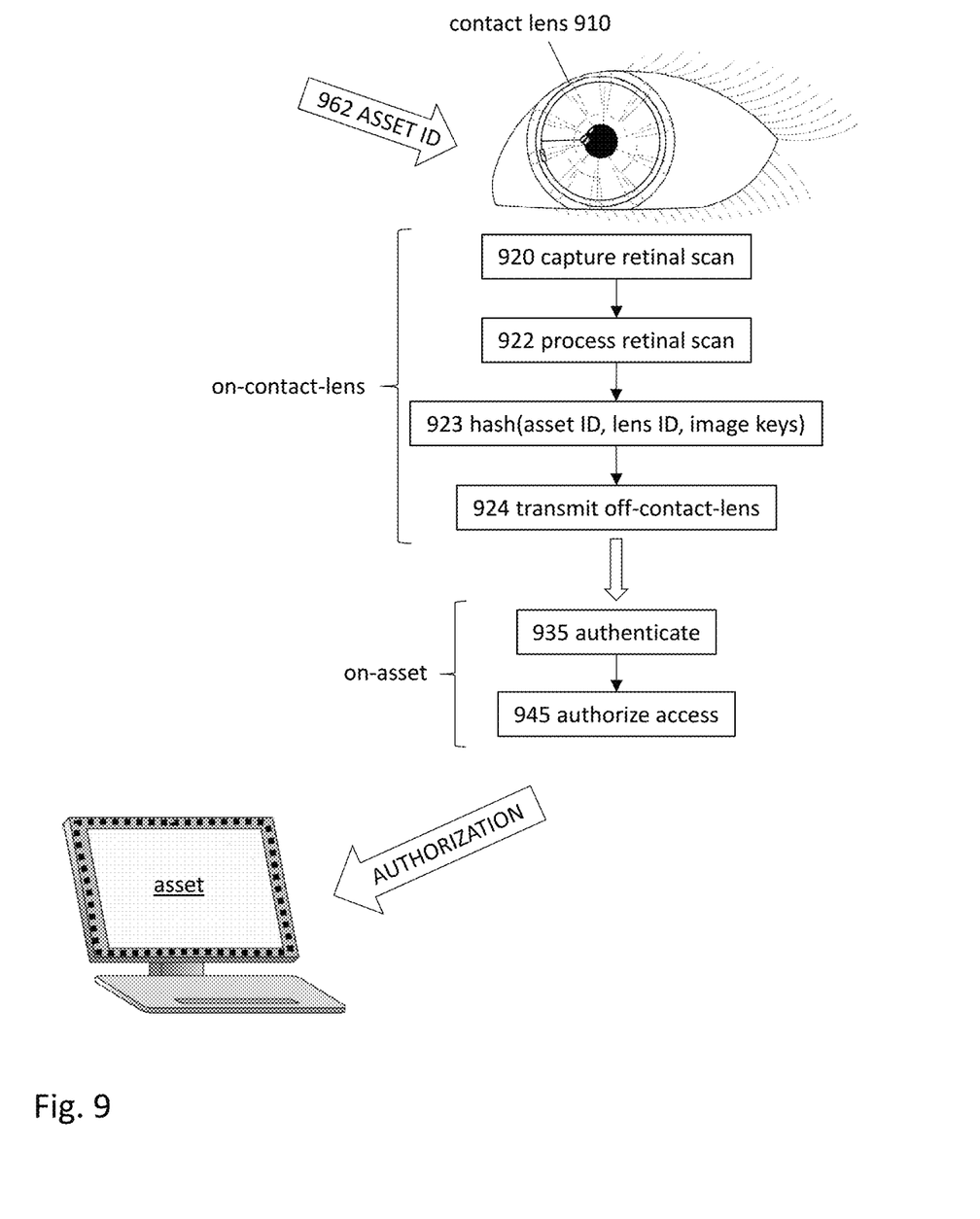
Figure 10:
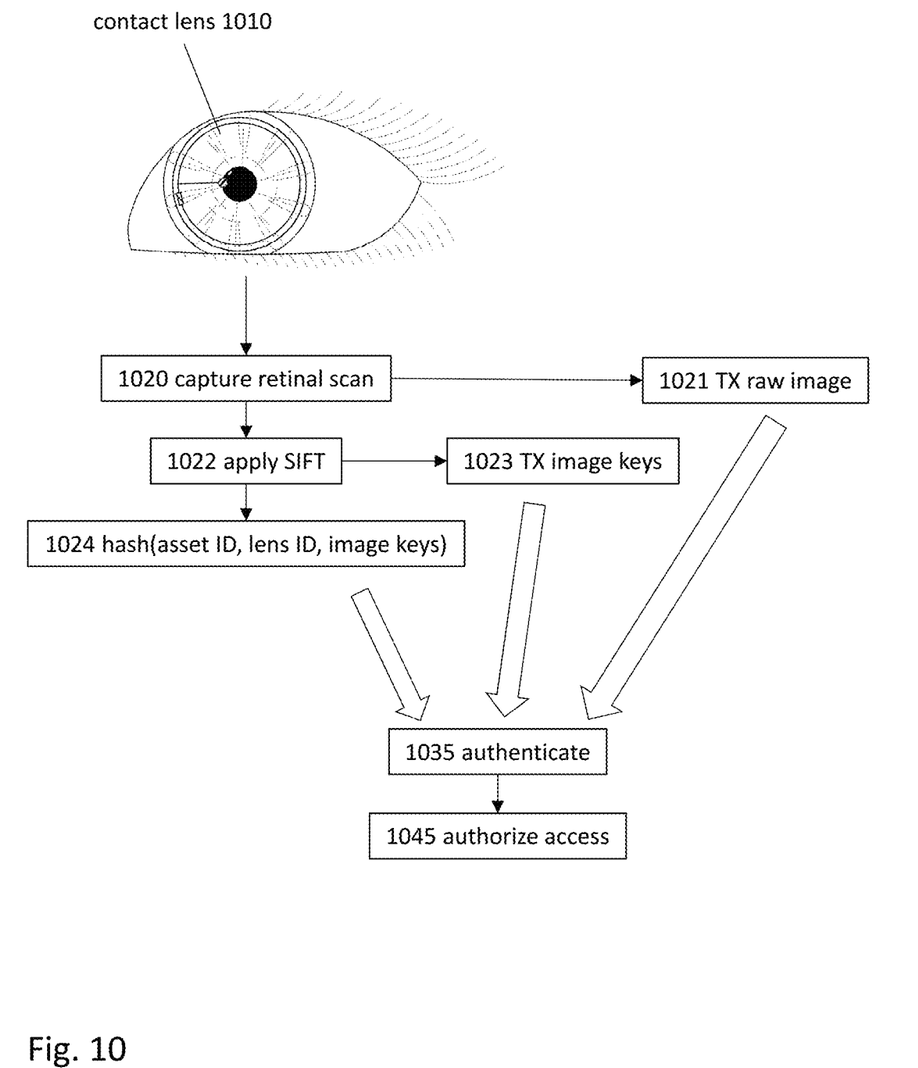

FIGS. 8, 9 and 10 illustrate examples of authentication system operation. In the example of FIG. 8, an electronic contact lens 810 captures 820 a fundus image and transmits 824 the image data to an external device for authentication of the user. Optionally, the fundus image may be processed 822 by electronics in the contact lens (on-contact-lens processing) and the processed data, rather than the raw image, transmitted 824 off-contact-lens for authentication of the user. For convenience, the data used to authenticate the user based on the retinal scan is referred to as retinal scan authentication data. Examples include the fundus image itself, features extracted from the fundus image, data derived from the fundus image (e.g., a hash of the image), and compressed or encrypted versions of any of the foregoing. The data may be transmitted via radio or optically, as described in FIGS. 6-7.

The external processing for authenticating 835 the user may take place in the device to which access is desired, such as a display terminal or steering wheel of a vehicle. It may take place in a necklace, belt, armband, wrist piece or other components that may be part of the contact lens system. Alternatively, authentication may be performed in a separate device such as a smart phone, smart watch or tablet. It may also occur remotely from the user's body, for example using cloud services. Here, in addition to authentication 835, some or all of the steps used to produce the authentication data may also be performed off-contact-lens.

In this case, if the user is successfully authenticated 835, the system then authorizes 845 access to the asset, such as a computer system. In one approach, this is accomplished by producing 845 an authorization string 848 that allows the person wearing the contact lens to access the asset.

As described above, the electronic contact lens 810 is a conduit for the retinal scan, which in some form is used to authenticate the user. The contact lens 810 itself may also be used to authenticate the user. For example, possession of a particular contact lens may be required as a second authentication factor. The contact lens 810 may generate additional authentication data, such as based on a serial number for the contact lens, and this contact lens authentication data may also be transmitted 824 off-contact-lens for authentication.

The contact lens authentication data and the retinal scan authentication data may be used separately in the authentication process. Alternatively, the two data may be combined and the combination used to authenticate the user. For example, the retinal scan and contact lens identification number may be processed and combined on-contact-lens, with the combination authentication data transmitted off-contact-lens in order to authenticate the user.

FIG. 9 illustrates another example of authentication system operation. In FIG. 9, as in FIG. 8, the asset to which access is desired is illustrated as a display screen. However, the authentication system is compatible with many other kinds of assets such as vehicles, automated teller machines, military equipment, door locks, etc. The asset in question, or its immediate surroundings, preferably includes an antenna for transmitting electromagnetic power to the contact lens. However, in alternate embodiments power may be supplied to the lens from other apparatus such a necklace worn by the person wearing the contact lens.

In the example of FIG. 9, the asset transmits an asset ID 962 to the lens. An asset ID may identify a display terminal or a specific internet site, as examples. An asset ID may be transmitted as data modulated on a radio frequency or optical carrier. In some embodiments the asset has an antenna that transmits a radio frequency carrier to supply power to the lens. Data may be transmitted simultaneously with power by modulating the carrier.

An asset ID may also be obtained by the lens via an outward facing imaging system on the lens. The outward facing imaging system may capture images of text, images, quick response (QR) codes, two dimensional matrix bar codes or other symbols. An image of a QR code, for example, may be quickly converted into data representing an asset ID by a processor or ASIC contained in the contact lens, for example.

The electronic contact lens 910 captures 920 an image of the fundus of the eyeball upon which the lens is mounted. The image includes patterns of blood vessels that are unique to each eyeball. The contact lens may be designed so that it does not store fundus images. In other words, all fundus image data is lost whenever the lens loses power. This prevents theft of fundus image data when the lens is not mounted on an eyeball.

The lens then processes 922 the fundus image to extract features or image keys from it using an image processing algorithm such as a scale-invariant feature transform algorithm, such as the SIFT method (U.S. Pat. No. 6,711,293) or similar approaches. A set of image keys identified by SIFT or another method may be referred to as a "reduced image". The SIFT algorithm produces the same image keys for an object when presented with different images of the object. In this case the object is the fundus or retina of the eyeball on which the electronic contact lens is mounted. Small changes in orientation of the lens upon the eyeball or in lighting of the fundus from ambient light or an inward-facing LED may lead to variations in images obtained by a retinal scanner. However, the SIFT algorithm or related methods produce the same image keys from each similar image. Thus a set of image keys is unique to each retinal pattern and the same set of image keys is generated every time an image of the particular retinal pattern is obtained.

In the example of FIG. 9, a cryptographic hash function is applied 923 to a combination of the asset ID, the contact lens ID and the image keys. An example of a combination is a concatenation of asset ID, lens ID and image keys. Other examples of combinations are the sum or product of those data. The lens ID is a unique identifier stored in the lens when it is manufactured. In some embodiments a lens ID is optional.

A cryptographic hash function (e.g. MD5 or SHA2 hash function) takes a string of any length as input and produce a fixed-length hash value. In the example of FIG. 9, the input is a combination of the asset ID, lens ID and image keys of fundus image. It is very difficult to determine the input of a hash function given a particular output. Furthermore, given one input string, it is very difficult to find another input string that generates the same output. Finally, it is very difficult to find two input strings that generate the same output. Even one-bit changes in the input change the output drastically.

The output of the hash function is then transmitted 924 to the asset. It is referred to as authentication data. It is the "password" that permits access to the asset. The authentication data is different for every asset and cannot be reproduced without wearing the electronic contact lens on the correct eyeball. The string may also be long and difficult to guess. For example, if the input to the SHA-256 hash function is the string:

assetID=329859843, lensID=98743097, imageKey=dc8151195f9619a9eab18d7d4bfdadd0 then the authentication data represented in hexadecimal is:

b9f277b14a85b9c2359ca8054a4741f890c336a59e8a3eeb2d6274537d815fc3

Changing the asset ID from 329859843 to 329859844, changes the hash output to:

8e6f88c27dca7c4b7dd5033bcac7b93d73f6bd990522c234e1a217134d4a7a98

In this example, this data is used to both authenticate 935 the user and grant access 945 to the asset. To determine whether the data is correct to grant access to an asset, the system may access a database of which contact lenses (identified by their lens ID) are registered to which users (identified by their retinal scan) and/or to which assets (identified by their asset ID). The database may contain hash values or other derived data, rather than the raw data. For example, a set of electronic contact lenses may be registered to a group of authorized persons and authentication may be based on whether the electronic contact lens has a correct lens ID and whether the retinal scan is for one of the authorized persons. Similarly, an electronic contact lens may be registered to a group of assets and authorization may be based on whether the electronic contact lens has a correct lens ID and whether the asset ID is for one of the assets in the group.

An asset, such as a screen, secure communications device, launch button, etc., may request authentication and/or authorization repeatedly. For example, authentication and/or authorization may be requested once per minute or even once per second. As an example, as soon as the lens wearer moves away from a screen or exits a vehicle, access may be stopped because the lens has moved too far away.

The contact lens may also include a time-based one-time password algorithm to change its lens ID as a function of time. A timestamp may be supplied to the contact lens by the asset or other device that transmits power and data to the lens.

Electrical power is limited on the contact lens. Therefore, instead of employing a general purpose microprocessor to perform SIFT or other algorithms (e.g. RIFT, G-RIF, SURF, PCA-SIFT, GLOH, Gauss-SIFT, etc.) to generate image keys, a purpose-built ASIC may be used. Similarly, special ASICs may be designed to perform cryptographic hash functions efficiently.

FIG. 10 provides another example of authentication system operation and illustrates different options that may be included in different embodiments. As in the examples of FIGS. 8 and 9, in FIG. 10, an electronic contact lens 1010 captures 1020 a fundus image of an eyeball upon which the lens is mounted.

In some embodiments a raw fundus image is transmitted 1021 by the lens to an external device after fundus image capture. In other embodiments a feature recognition algorithm (e.g. SIFT, etc.) is performed 1022 on the image in an application specific integrated circuit contained in the lens. Image keys, but not raw image data, are transmitted 1023 to an external device. In still other embodiments, a cryptographic hash function is applied 1024 to a combination of an asset ID, a lens ID and the image keys. In some embodiments either the asset ID or the lens ID, or both, may be omitted from the input to the hash function. The various possibilities illustrated in FIG. 10 represent tradeoffs among computational complexity and security. It is computationally simpler not to perform feature recognition on a contact lens, for example, but doing so enables a system in which the fundamental information—patterns of structures in the retina—is neither transmitted from, nor stored in a contact lens.

In addition, the various functions may occur on-contact-lens, off-contact-lens but close to the user, or remote from the user. As an example, if the electronic contact lens is registered to a specific user, the fundus image for the user may be stored in secure memory on the contact lens. Authentication based on the retinal scan may then occur on-contact-lens. As another example, if the electronic contact lens is registered to a specific asset, authorization to access the asset may occur on-contact-lens.

Further improvements may be obtained by combining the authentication schemes described above with other authentication factors. For example, an asset may require retina based authentication as described above plus voice recognition. As another example, authentication may be based on retinal scans of both eyes, not just one eye.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

The term "module" is not meant to be limited to a specific physical form. Depending on the specific application, modules can be implemented as hardware, firmware, software, and/or combinations of these. Furthermore, different modules can share common components or even be implemented by the same components. There may or may not be a clear boundary between different modules, even if drawn as separate elements in the figures. For example, in FIG. 8, authentication 835 and authorization 845 may be performed by an authentication module and an authorization module, respectively. These modules may be implemented as hardware, firmware, software, and/or combinations of these. Furthermore, a single component may implement both authentication and authorization.

What is claimed is:

1. A method for authorizing access to an asset, the method comprising:
    authenticating a user based on an electronic contact lens worn on the user's eye and on a retinal scan of the user's eye, the electronic contact lens containing a retinal scanner that captures the retinal scan of the user's eye; where authenticating the user comprises:
        transmitting contact lens authentication data from the electronic contact lens to off-contact-lens, the contact lens authentication data based on an identification of the electronic contact lens that is stored on and retrieved from the contact lens; and processing the contact lens authentication data off-contact-lens to authenticate the user based on the identification of electronic contact lens; and
        transmitting retinal scan authentication data from the electronic contact lens to off-contact-lens, the retinal scan authentication data based on the retinal scan; and processing the retinal scan authentication data off-contact-lens to authenticate the user based on the retinal scan; and
    authorizing access to the asset based on successful authentications of the user from processing the contact lens authentication data and from processing the retinal scan authentication data.

2. The method of claim 1 where authenticating the user comprises:
    creating combination authentication data based on both an identification of the electronic contact lens and on the retinal scan;
    transmitting the combination authentication data from the contact lens to off-contact-lens; and
    processing the combination authentication data off-contact-lens to authenticate the user.

3. The method of claim 1 where authenticating the user occurs remote from the user's body.

4. The method of claim 1 where authorizing access to the asset occurs on-contact-lens.

5. The method of claim 1 where authenticating the user is based further on another retinal scan of the user's other eye, the other retinal scan captured by another retinal scanner contained in another electronic contact lens worn on the user's other eye.

6. The method of claim 1 where the electronic contact lens is registered to a group of one or more authorized persons, and authorizing access to the asset is also based on whether the user is one of the authorized persons registered to the electronic contact lens.

7. The method of claim 1 where the electronic contact lens is registered to a group of one or more resources, and authorizing access to the asset is also based on whether the asset is one of the authorized resources registered to the electronic contact lens.

8. The method of claim 1 where the retinal scan is a two-dimensional image of a fundus of the user's eye.

9. A system for authorizing access to an asset, the system comprising:
    an electronic contact lens that contains a retinal scanner, the retinal scanner capturing a retinal scan of a user's eye when the electronic contact lens is worn on the user's eye, where the retinal scanner includes a one-dimensional sensor array and the retinal scanner further includes a lens that images a two-dimensional area of a fundus of the user's eye onto the one-dimensional sensor array;
    an authentication module that authenticates the user based on the electronic contact lens and on the retinal scan captured by the retinal scanner; and
    an authorization module that authorizes access to the asset based on successful authentication of the user.

10. A system for authorizing access to an asset, the system comprising:
    an electronic contact lens that contains a retinal scanner, the retinal scanner capturing a retinal scan of a user's eye when the electronic contact lens is worn on the user's eye, where the retinal scanner includes a one-dimensional sensor array that is scanned across a fundus of the user's eye, and the retinal scan is a two-dimensional scanned image of the fundus;
    an authentication module that authenticates the user based on the electronic contact lens and on the retinal scan captured by the retinal scanner; and
    an authorization module that authorizes access to the asset based on successful authentication of the user.

11. The system of claim 10 where the retinal scanner includes a single sensor that is scanned across a fundus of the user's eye.

12. The system of claim 10 where the retinal scanner captures a multi-spectral retinal scan.

13. The system of claim 10 where the retinal scanner operates in an infrared wavelength range.

* * * * *